United States Patent
Yanagisawa

(10) Patent No.: US 9,590,912 B2
(45) Date of Patent: Mar. 7, 2017

(54) DATA TRANSFER METHOD FOR EFFICIENTLY TRANSFERRING BULK DATA

(75) Inventor: Kentaro Yanagisawa, Tokyo (JP)

(73) Assignee: SKEED CO., LTD., Tokyo (JP)

( * ) Notice: Subject to any disclaimer, the term of this patent is extended or adjusted under 35 U.S.C. 154(b) by 0 days.

(21) Appl. No.: 14/237,615

(22) PCT Filed: Jun. 27, 2012

(86) PCT No.: PCT/JP2012/066383
§ 371 (c)(1),
(2), (4) Date: May 28, 2014

(87) PCT Pub. No.: WO2013/021745
PCT Pub. Date: Feb. 14, 2013

(65) Prior Publication Data
US 2014/0254365 A1    Sep. 11, 2014

(30) Foreign Application Priority Data
Aug. 10, 2011 (JP) .................. 2011-174431

(51) Int. Cl.
*H04L 12/825* (2013.01)
*H04L 29/08* (2006.01)
*H04L 12/841* (2013.01)

(52) U.S. Cl.
CPC .............. *H04L 47/25* (2013.01); *H04L 47/26* (2013.01); *H04L 47/283* (2013.01); *H04L 67/06* (2013.01)

(58) Field of Classification Search
None
See application file for complete search history.

(56) References Cited

U.S. PATENT DOCUMENTS 6,839,321 B1 *  1/2005  Chiruvolu .................. 370/230.1
8,514,755 B2 *  8/2013  Kawada ........................ 370/310
(Continued)

FOREIGN PATENT DOCUMENTS

EP    1202487 A2    5/2002
JP    2001-160824 A    6/2001
(Continued)

OTHER PUBLICATIONS

Notice of Reasons for Refusal for Japanese Patent Application No. JP2011-174431, dated Sep. 19, 2012, pp. 1-2.
(Continued)

*Primary Examiner* — Rhonda Murphy
(74) *Attorney, Agent, or Firm* — MKG, LLC

(57) ABSTRACT

A receiving side data communication device calculates, at prescribed times, an actual measured RTT, which is the time required for data to travel to a transmission side data communication device and back, a data transfer rate for the data transfer, and a data loss ratio, which is the ratio of the number of packets not received by the receiving side data communication device to the number of packets sent from the transmission side data communication device. The receiving side data communication device uses the most recent data transfer rate and the data loss ratio to calculate a transfer score according to a prescribed calculation formula, and increases or decreases the reference RTT in accordance with the change in the transfer score.

9 Claims, 7 Drawing Sheets

(56) References Cited

U.S. PATENT DOCUMENTS

| | | |
|---|---|---|
| 8,775,658 B2* | 7/2014 | Barreto et al. ............... 709/231 |
| 2006/0029037 A1 | 2/2006 | Chen et al. |
| 2010/0020682 A1 | 1/2010 | Yamada |

FOREIGN PATENT DOCUMENTS

| | | |
|---|---|---|
| JP | 2004-193991 A | 7/2004 |
| JP | 2009-207084 A | 9/2009 |

OTHER PUBLICATIONS

PCT International Search Report issued in International Application No. PCT/JP2012/066383, date mailed Aug. 7, 2012., pp. 1.
Extended European Search Report for European Patent Application No. 12821845.0-1853/2753027 PCT/JP2012066383, dated Apr. 2, 2015.

* cited by examiner (a)

(b)

DATA TRANSFER METHOD FOR EFFICIENTLY TRANSFERRING BULK DATA

TECHNICAL FIELD

This invention relates to a technique for transferring bulk data via a network.

BACKGROUND

File Transfer Protocol (FTP) is a protocol commonly used for transferring bulk data having a comparatively large size between different data communication devices via a network.

FTP is used in accordance with Transmission Control Protocol (TCP), which is a protocol for controlling data transmission. Accordingly, a bandwidth control following TCP is executed when a bulk data transfer following FTP is executed.

When data transmission is executed in accordance with TCP, a data set to be transmitted is divided into plural data packets, and the data packets are transmitted from a data communication device at a transmission side (referred to as a "transmission side data communication device" hereinafter) to a data communication device at a receiving side (referred to as a "receiving side data communication device" hereinafter). When the receiving side data communication device receives a data packet, the receiving side data communication device transmits to the transmission side data communication device a response data set indicating acknowledgement of receipt of the data packet (referred to as an "ACK" hereinafter).

When the transmission side data communication device does not receive an ACK for a data packet within a predetermined time period after the data packet is transmitted from the transmission side data communication device, it is determined by the transmission side data communication device that the data packet is lost. The data packet that is lost is referred to as a "lost data packet" hereinafter. The transmission side data communication device calculates a data packet loss ratio that is a ratio of a number of lost data packets to a number of total transmitted data packets in a unit time. A length of time from a transmission timing of a data packet to a receiving timing of an ACK corresponding to the data packet, namely a length of time required for data to make a round trip between the transmission side data communication device and the receiving side data communication device, is generally called a Round Trip Time (RTT).

When a data packet loss ratio becomes higher than a predetermined threshold value, the transmission side data communication device determines that there is congestion on network route between the transmission side data communication device and the receiving side data communication device, and significantly decreases a data transmission rate that is a data amount transmitted in a unit time; namely, a data transmission speed. Then, the transmission side data communication device gradually increases the data transmission rate. By the above explained control of data transmission rate, namely a bandwidth control, serious network congestion is avoided.

There may be several reasons for data packet loss other than network congestion, such as noise in a wireless network. For example, a data packet may be considered as a lost data packet when it takes too long time for an ACK to reach a transmission side data communication device because a receiving side data communication device is located far away from the transmission side data communication device in a network.

Loss of data packets caused by reasons other than network congestion cannot be solved by decreasing a data transmission rate. Accordingly, when a data packet loss ratio is increased by loss of packets caused by any reason other than network congestion, decrease of a data transmission rate brings no merit. However, when data is transferred by use of FTP in accordance with TCP, a data transmission rate is decreased even when a data packet loss ratio is increased for a reason other than network congestion, and use of some bands for data transmission may be stopped unnecessarily.

Some solutions for the above explained problem of FTP are proposed.

For example, JP2001-160824A discloses a system that can decrease a data packet loss ratio effectively. In the system disclosed in JP2001-160824A, when a data packet loss ratio is higher than a threshold value because of data transmission errors, data is transmitted by data packets with a shorter packet length than usual; and when a data packet loss ratio is higher than a threshold value because of late arrivals of ACKs and an RTT is longer than a threshold value, a data transmission rate is decreased.

For example, JP2004-193991A discloses a system that can properly adjust a data transmission rate in response to changes in network conditions. In the system disclosed in JP2004-193991A, when an RTT is changing with a decreasing trend, a data transmission rate is increased; when an RTT is changing with an increasing trend, a data transmission rate is decreased; when a data packet loss ratio is lower than a threshold value and the data packet loss ratio is unstable, a data transmission rate is increased; and when a data packet loss ratio is higher than a threshold value and the data packet loss ratio is unstable, a data transmission rate is decreased.

Further, for example, JP2009-207084A discloses a system by which streaming data can always be distributed at an encode rate that is as high as possible. In the system disclosed in JP2009-207084A, when an encode rate increases in response to an increase in a data transmission rate, the data transmission rate is further increased; when an encode rate decreases in response to an increase in a data transmission rate, the data transmission rate is decreased; when an encode rate increases in response to a decrease in a data transmission rate, the data transmission rate is further decreased; and when an encode rate decreases in response to a decrease of a data transmission rate, the data transmission rate is increased.

According to the system disclosed in JP2001-160824A, data packet losses caused by data transmission errors may be appropriately decreased, but data packet losses caused by late arrivals of ACKs cannot be appropriately decreased. Accordingly, according to the system disclosed by JP2001-160824A, when a receiving side data communication device is located far away from a transmission side data communication device, a performance of data transmission between the data communication devices may become unsatisfactory.

According to the system disclosed in JP2004-193991A, when an RTT is stable or a data packet loss ratio is stable, a data transmission rate is not changed. Accordingly, for example, when a low data transmission rate is set in a situation where the network has no congestion, the low data transmission rate may be maintained, and an efficient performance of data transmission may not be provided.

According to the system disclosed in JP2009-207084A, a high data transmission rate may be maintained for data transmission between a transmission side data communication device and a receiving side data communication device regardless of existence of network congestion, which may cause poor performance of data transmissions among other data communication devices in the network.

SUMMARY

In view of the foregoing, it is an object of the present invention to provide a means that enables consistent high performance data transfer between different data communication devices via a network, without compounding network congestion.

In a first aspect of the present invention, there is provided a data transfer method performed by a data transfer system for transferring data from a transmission side data communication device to a receiving side data communication device comprising:

when a data transmission rate is defined as a data amount transmitted in a unit time from the transmission side data communication device to the receiving side data communication device, a data loss ratio is defined as a ratio of an amount of data not received by the receiving side data communication device to an amount of data transmitted from the transmission side data communication device to the receiving side data communication device, and a data transmission required time is defined as a one way or a round trip time required for data to travel between the transmission side data communication device and the receiving side data communication device, obtaining, by the receiving side data communication device, a data transmission rate, a data loss ratio, and a data transmission required time, in relation to a past certain time period;

increasing, by the receiving side data communication device, a threshold of data transmission required time following a predetermined rule when one or more obtained data transmission rates and one or more obtained data loss ratios in relation to one or more past certain time periods meet a first predetermined condition; and decreasing the threshold of data transmission required time following a predetermined rule when the one or more obtained data transmission rates and the one or more obtained data loss ratios in relation to the one or more past certain time periods meet a second predetermined condition;

transmitting, by the receiving side data communication device, an instruction data set instructing to increase a data transmission rate when an obtained data transmission required time in relation to a past certain time period is shorter than the threshold of data transmission required time; and transmitting an instruction data set instructing to decrease a data transmission rate when the obtained data transmission required time in relation to the past certain time period is longer than the threshold of data transmission required time; and changing, by the transmission side data communication device, a data transmission rate at which data is transmitted to the receiving side data communication device following an instruction indicated by an instruction data set transmitted from the receiving side data communication device.

In a second aspect of the present invention, there is provided, as an alternative method to that of the first aspect, a data transfer method performed by a data transfer system for transferring data from a transmission side data communication device to a receiving side data communication device comprising:

when a data transmission rate is defined as a data amount transmitted in a unit time from the transmission side data communication device to the receiving side data communication device, a data loss ratio is defined as a ratio of an amount of data not received by the receiving side data communication device to an amount of data transmitted from the transmission side data communication device to the receiving side data communication device, and a data transmission required time is defined as a one way or a round trip time required for data to travel between the transmission side data communication device and the receiving side data communication device, obtaining, by the receiving side data communication device, a data transmission rate and a data loss ratio in relation to a past certain time period;

obtaining, by the transmission side data communication device, a data transmission required time in relation to a past certain time period;

increasing, by the receiving side data communication device, a threshold of data transmission required time following a predetermined rule when one or more obtained data transmission rates and one or more obtained data loss ratios in relation to one or more past certain time periods meet a first predetermined condition; and decreasing the threshold of data transmission required time following a predetermined rule when the one or more obtained data transmission rates and the one or more obtained data loss ratios in relation to the one or more past certain time periods meet a second predetermined condition;

transmitting, by the receiving side data communication device, the threshold of data transmission required time to the transmission side data communication device; and increasing, by the transmission side data communication device, a data transmission rate at which data is transmitted to the receiving side data communication device when an obtained data transmission required time in relation to a past certain time period is shorter than the threshold of data transmission required time; and decreasing a data transmission rate at which data is transmitted to the receiving side data communication device when the obtained data transmission required time in relation to the past certain time period is longer than the threshold of data transmission required time.

In a third aspect of the present invention, there is provided the data transfer method of the first or the second aspect, comprising:

calculating, by the receiving side data communication device, an index indicating a performance of data transmission following a predetermined formula based on the obtained data transmission rate and the obtained data loss ratio in relation to a past certain time period, wherein:

each of the first predetermined condition and the second predetermined condition is a condition that is met when a direction of change from an index calculated in relation to a first past certain time period to an index calculated in relation to a second past certain time period later than the first past certain time period is a predetermined direction.

In a fourth aspect of the present invention, there is provided, as an alternative method to that of the first or the second aspect, a data transfer method performed by a data transfer system for transferring data from a transmission side data communication device to a receiving side data communication device comprising:

when a data transmission rate is defined as a data amount transmitted in a unit time from the transmission side data communication device to the receiving side data communication device, a data loss ratio is defined as a ratio of an amount of data not received by the receiving side data communication device to an amount of data transmitted from the transmission side data communication device to the receiving side data communication device, and a data transmission required time is defined as a one way or a round trip time required for data to travel between the transmission side data communication device and the receiving side data communication device, obtaining, by the transmission side data communication device, a data transmission rate, a data loss ratio, and a data transmission required time, in relation to a past certain time period;

increasing, by the transmission side data communication device, a threshold of data transmission required time following a predetermined rule when one or more obtained data transmission rates and one or more obtained data loss ratios in relation to one or more past certain time periods meet a first predetermined condition; and decreasing the threshold of data transmission required time following a predetermined rule when the one or more obtained data transmission rates and the one or more obtained data loss ratios in relation to the one or more past certain time periods meet a second predetermined condition; and increasing, by the transmission side data communication device, a data transmission rate at which data is transmitted to the receiving side data communication device when an obtained data transmission required time in relation to a past certain time period is shorter than the threshold of data transmission required time; and decreasing a data transmission rate at which data is transmitted to the receiving side data communication device when the obtained data transmission required time in relation to the past certain time period is longer than the threshold of data transmission required time.

In a fifth aspect of the present invention, there is provided the data transfer method of the fourth aspect, comprising:

calculating, by the transmission side data communication device, an index indicating a performance of data transmission following a predetermined formula based on the obtained data transmission rate and the obtained data loss ratio in relation to a past certain time period, wherein:

each of the first predetermined condition and the second predetermined condition is a condition that is met when a direction of change from an index calculated in relation to a first past certain time period to an index calculated in relation to a second past certain time period later than the first past certain time period is a predetermined direction.

In a sixth aspect of the present invention, there is provided the data transfer method of the third or the fifth aspect, wherein:

when a first direction is defined as a calculated direction of change from the index calculated in relation to the first past certain time period to the index calculated in relation to the second past certain time period later than the first past certain time period, and a second direction is defined as a calculated direction of change from the index calculated in relation to the second past certain time period to an index calculated in relation to a third past certain time period later than the second past certain time period, the predetermined rule for increasing the threshold of data transmission required time is a rule by which the threshold of data transmission required time is increased at a smaller rate of increase in a case where the first direction and the second direction are opposite than in a case where the first direction and the second direction are the same; and the predetermined rule for decreasing the threshold of data transmission required time is a rule by which the threshold of data transmission required time is decreased at a smaller rate of decrease in a case where the first direction and the second direction are opposite than in a case where the first direction and the second direction are the same.

In a seventh aspect of the present invention, there is provided the data transfer method of the third, the fifth or the sixth aspect, wherein:

a value of function of data transmission rate and data loss ratio is calculated as the index in the calculating step, the function being a monotonically increasing function of data transmission rate and being a monotonically decreasing function of data loss ratio, and a partial derivative of the function with respect to data loss ratio being a monotonically increasing function of data loss ratio.

In an eighth aspect of the present invention, there is provided the data transfer method of any one of the first to the seventh aspects comprising:

storing, by the receiving side data communication device, a data set indicating the threshold of data transmission required time used for past data transmission in association with a data set identifying the transmission side data communication device, or storing, by the transmission side data communication device, a data set indicating the threshold of data transmission required time used for past data transmission in association with a data set identifying the receiving side data communication device.

According to the data transfer method of the first, the second or the fourth aspect of the present invention, the threshold of data transmission required time is adjusted based on the data transmission rate and the data loss ratio, and the data transmission rate is increased when an actual measured data transmission required time is shorter than the adjusted threshold of data transmission required time and the data transmission rate is decreased when the actual measured data transmission required time is longer than the adjusted threshold of data transmission required time. Namely, a mechanism of adjusting a data transmission rate indirectly by adjusting a threshold of data transmission required time based on a data transmission rate and a data loss ratio during a past certain time period is adopted in addition to a mechanism of adjusting a data transmission rate directly by comparing an actual measured data transmission required time and a threshold of data transmission required time. As a result, a data transmission rate is dynamically changed without a risk of a data transmission rate becoming inappropriate to an actual situation, and a preferable adjustment of data transmission rate is maintained. Accordingly, a high performance of data transfer is achieved without compounding network congestion.

According to the data transfer method in the third or the fifth aspect of the present invention, the threshold of data transmission required time is adjusted in accordance with a direction of change of an index indicating a performance of data transfer calculated based on a data transmission rate and a data loss ratio. As a result, when a performance of data transfer tends to increase in response to an increase in a threshold of data transmission required time, a high performance of data transfer is achieved by further increasing the threshold of data transmission required time so that the data transmission rate tends to be increased to use unused bandwidth for data transmission; and when a performance of data transfer tends to increase in response to a decrease in a threshold of data transmission required time, a preferable situation of data transfer is achieved from a viewpoint of fair use of network resources by further decreasing the threshold of data transmission required time so that the data transmission rate tends to be decreased to ease network congestion.

According to the data transfer method of the sixth aspect of the present invention, when an index indicating a performance of data transfer is unstable, it is judged more carefully than usual whether the threshold of data transmission required time should be increased to give priority to performance of data transfer or the threshold of data transmission required time should be decreased to give priority to fair use of network resources. As a result, an uneven fluctuation in data transmission rate is avoided.

According to the data transfer method of the seventh aspect of the present invention, the threshold of data transmission required time is adjusted in accordance with a performance of data transfer focusing more on a change of a data loss ratio when the data loss ratio is comparatively low. Namely, when data is transferred between data communication devices that are close to each other and a data loss ratio is low, the threshold of data transmission required time is adjusted more sensitively in accordance with a data loss ratio since a data loss ratio is easily influenced by network congestion in general; and when data is transferred between data communication devices that are far away from each other or data is transferred via a wireless network, the threshold of data transmission required time is adjusted to be less sensitive in accordance with a data loss ratio since a data loss ratio is likely influenced by factors other than network congestion in general. As a result, a preferable performance is achieved.

According to the data transfer method of the eighth aspect of the present invention, a threshold of data transmission required time used for data transmission between a transmission side data communication device and a receiving side data communication device during a past certain time period can be used, for example, as a default threshold of data transmission required time for data transmission between the transmission side data communication device and the receiving side data communication device in the future. As a result, a data transmission rate is properly adjusted soon after a new data transfer starts between the transmission side data communication device and the receiving side data communication device.

DETAILED DESCRIPTION

Exemplary Embodiment

Explanation of configuration and behavior of data transfer system 1 according to an exemplary embodiment of the present invention will now be provided.

Figure 1:
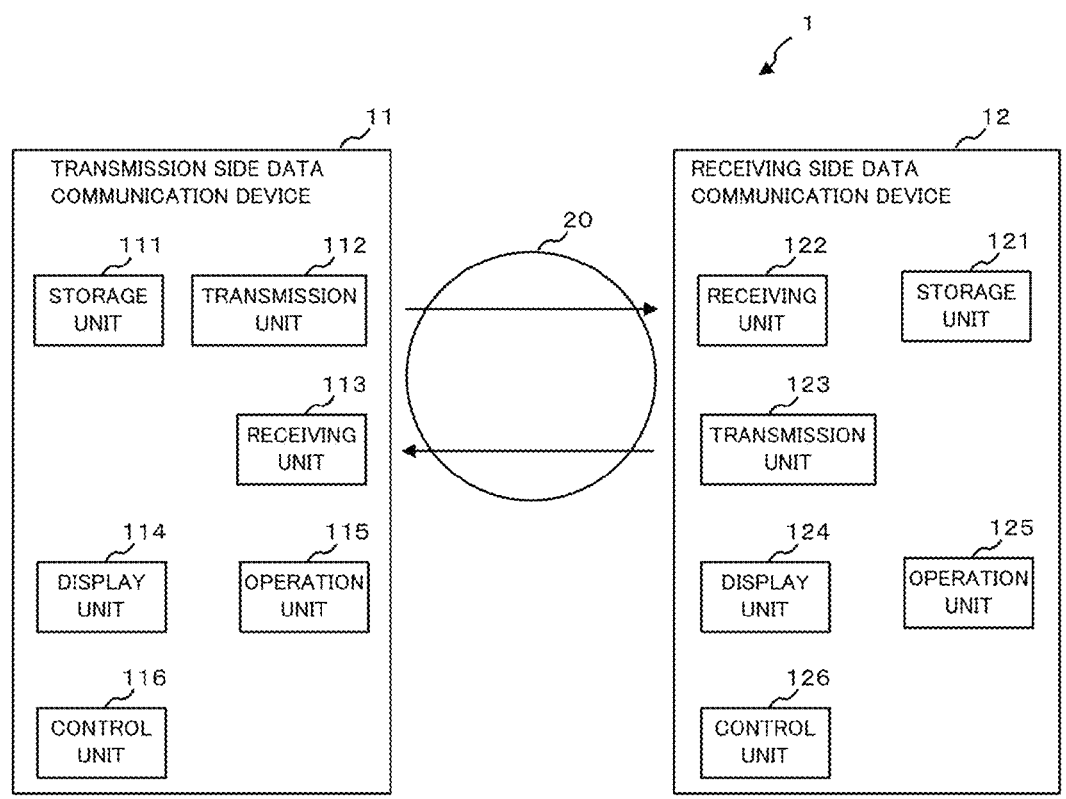
FIG. 1 shows a block diagram of a configuration of a data transfer system according to an exemplary embodiment of the present invention.

FIG. 1 shows a block diagram of configuration of data transfer system 1. Data transfer system 1 has transmission side data communication device 11 that is a data communication device from which bulk data is transmitted, and receiving side data communication device 12 that is a data communication device by which the bulk data is received. Transmission side data communication device 11 and receiving side data communication device 12 are able to communicate with each other via Internet 20.

Transmission side data communication device 11 has the following elements:

storage unit 111 that stores various data such as program instructing processes to be executed by transmission side data communication device 11, data received from receiving side data communication device 12, and so on;

transmission unit 112 that transmits various data such as data packets of bulk data, data identifying data packets transmitted to receiving side data communication device 12, ACKs of probe data for measuring RTTs transmitted from receiving side data communication device 12, and so on, to receiving side data communication device 12;

receiving unit 113 that receives various data such as probe data, data requesting to resend lost data packets, data instructing increase and decrease of data transmission rate, and so on, from receiving side data communication device 12;

display unit 114 that displays various information such as a progress of data transfer, to a user of transmission side data communication device 11;

operation unit 115 that receives data input of the user of transmission side data communication device 11 by generating data corresponding to operations performed by the user; and control unit 116 that controls elements of transmission side data communication device 11 other than control unit 116 and executes various kinds of processes such as calculation processes, judgment processes, and so on.

Receiving side data communication device 12 has the following elements:

storage unit 121 that stores various data such as program instructing processes to be executed by receiving side data communication device 12, data received from transmission side data communication device 11, and so on;

receiving unit 122 that receives various data such as data packets of bulk data, ACKs of probe data for measuring RTTs, data identifying data packets of the bulk data already transmitted from transmission side data communication device 11, and so on, from transmission side data communication device 11;

transmission unit 123 that transmits various data such as probe data, data requesting to resend lost data packets, data instructing increase and decrease in data transmission rate, and so on, to transmission side data communication device 11;

display unit 124 that displays a variety of information such as a progress of data transfer, to a user of receiving side data communication device 12;

operation unit 125 that receives data input of a user of receiving side data communication device 12 by generating data corresponding to operations made by the user; and control unit 126 that controls elements of receiving side data communication device 12 other than control unit 126 and executes various kinds of processes such as calculation processes, judgment processes, and so on.

Figure 2:
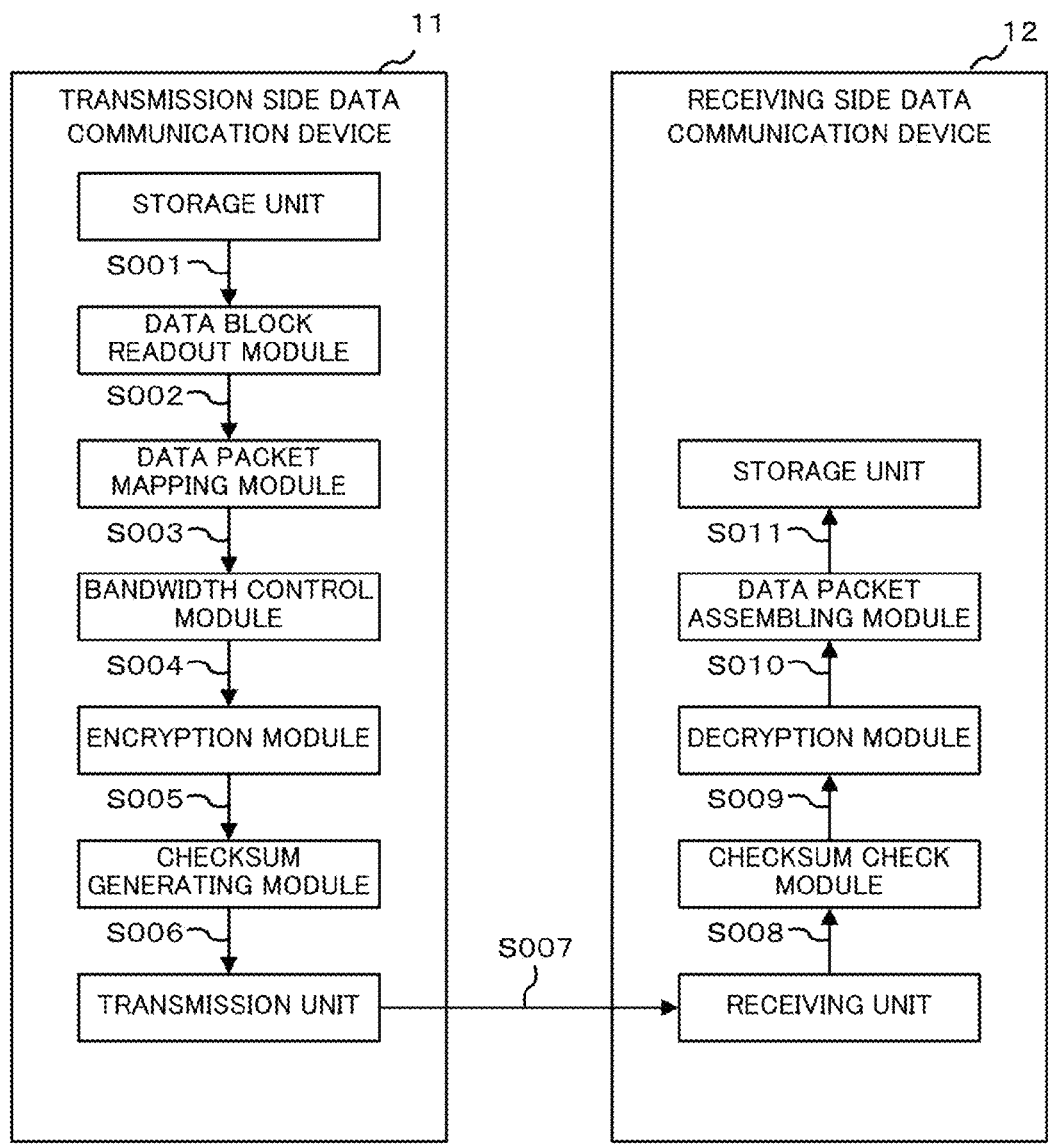
FIG. 2 shows functional configurations of a transmission side data communication device and a receiving side data communication device according to the exemplary embodiment of the present invention and a sequence of operations of the devices.

FIG. 2 shows functional configurations of transmission side data communication device 11 and receiving side data communication device 12 according to the exemplary embodiment of the present invention and a sequence of operations executed by transmission side data communication device 11 and receiving side data communication device 12 when bulk data is transferred in data transfer system 1.

Each of modules of transmission side data communication device 11 explained below is a functional component realized when control unit 116 of transmission side data communication device 11 executes processes following instructions of a program stored in storage unit 111. Similarly, each of modules of receiving side data communication device 12 explained below is a functional component realized when control unit 126 of receiving side data communication device 12 executes processes following instructions of a program stored in storage unit 121.

A sequence of operations executed when bulk data is transferred is explained below. A block readout module of transmission side data communication device 11 reads out a file of bulk data from storage unit 111 (S001), divides the bulk data into plural data blocks, and hands over the data blocks to a data packet mapping module (S002).

The data packet mapping module further divides each of the data blocks into data fragments, generates data packets each containing one of the data fragments following User Datagram Protocol (UDP), and hands over the data packets to a bandwidth control module (S003). UDP is a protocol for data transfer that has no error control function and thus is less restrictive than TCP.

The bandwidth control module sequentially hands over the data packets to an encryption module (S004) at a data transmission rate determined by a mechanism explained in a later part of this explanation of the exemplary embodiment.

The encryption module encrypts the data packets following a predetermined encryption algorithm to generate encrypted data packets. For example, Diffie-Hellman key exchange and Advanced Encryption Standard (AES) algorithm may be adopted in data transfer system 1. The encryption module hands over the encrypted data packets to a checksum generating module (S005).

The checksum generating module generates a message digest of each of the encrypted data packets as a checksum data set, and attaches the checksum data set to the encrypted data packet to generate an encrypted data packet with checksum. For example, Secure Hash Algorithm 1 (SHA-1) may be adopted as an algorithm for generating checksum data sets in data transfer system 1. The checksum generating module hands over the encrypted data packets with checksums to transmission unit 112 (S006).

Transmission unit 112 transmits the encrypted data packets with checksums to receiving side data communication device 12 (S007). Receiving side data communication device 12 receives the encrypted data packets with checksums by receiving unit 122.

Receiving unit 122 hands over the encrypted data packets with checksums to a checksum check module (S008).

The checksum check module generates a message digest of each of the encrypted data packets contained in the received encrypted data packets with checksums, and verifies the generated message digest and the checksum data set contained in the received encrypted data packet with checksum. When the verification is successful, the checksum check module hands over the encrypted data packet contained in the received encrypted data packet with checksum to a decryption module (S009).

The decryption module decrypts the encrypted data packets to generate data packets without encryption, and hands over the generated data packets to a data packet assembling module (S010).

The data packet assembling module assembles the data fragments contained in the data packets in the order of data packet numbers of the data packets to generate data blocks, and storage unit 111 sequentially stores the data blocks to reconstruct the bulk data in storage unit 111 (S011).

Data transfer system 1 has a function of controlling a bandwidth of bulk data transfer; namely, a mechanism that dynamically adjusts a data transmission rate to a proper value.

In this application, a "data transmission rate" means an amount of data transmitted from transmission side data communication device 11 to receiving side data communication device 12 in a unit time. For example, "5 Mbps" is a data transmission rate when 5 megabits of data is transmitted in a second.

Figure 3:
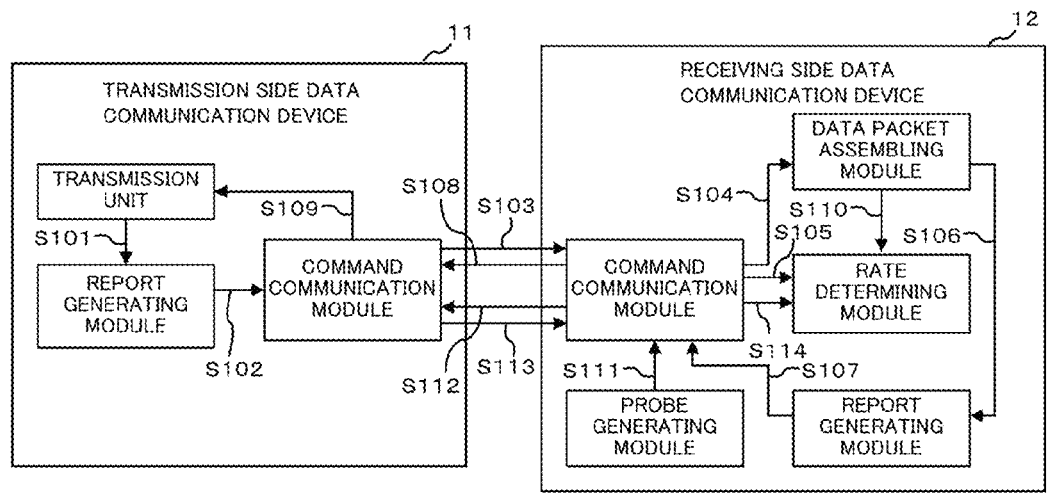
FIG. 3 shows a sequence of operations for obtaining data used for controlling bandwidth in the data transfer system according to the exemplary embodiment of the present invention.

FIG. 3 shows a sequence of operations for obtaining data used for controlling bandwidth in data transfer system 1.

Transmission unit 112 of transmission side data communication device 11 reports data packet numbers identifying data packets, which are already transmitted to receiving side data communication device 12, to a report generating module (S101) during the transfer of the bulk data.

In response to the report from transmission unit 112, the report generating module generates a report data set indicating data packet numbers of the data packets transmitted to receiving side data communication device 12 and timings of the transmissions, and hands over the report data set to a command communication module (S102).

The command communication module transmits the report data set to receiving side data communication device 12, and a command communication module of receiving side data communication device 12 receives the report data set (S103). The command communication module of transmission side data communication device 11 transmits report data sets by use of transmission unit 112 and receives report data sets by use of receiving unit 113. Similarly, the command communication module of receiving side data communication device 12 receives report data sets by use of receiving unit 122 and transmits report data sets by use of transmission unit 123.

The command communication module of receiving side data communication device 12 hands over the report data set to each of a data packet assembling module (S104) and a rate determining module (S105).

The data packet assembling module obtains data packet numbers of data packets that have already been transmitted from transmission side data communication device 11 and timings of transmissions of the data packets indicated by the report data set received from transmission side data communication device 11. Then, the data packet assembling module verifies the data packet numbers with the data packet numbers obtained from the decryption module to specify lost data packets that are data packets transmitted from transmission side data communication device 11 and that failed to reach receiving side data communication device 12 within a predetermined time period. The data packet assembling module hands over data packet numbers of the lost data packets to the report generating module (S106).

The report generating module generates a report data set instructing to resend the lost data packets identified by the data packet numbers from the data packet assembling module, and hands over the report data set to the command communication module (S107).

The command communication module of receiving side data communication device 12 transmits the report data set instructing to resend the lost data packets to transmission side data communication device 11, and the command communication module of transmission side data communication device 11 receives the report data set (S108).

The command communication module of transmission side data communication device 11 hands over the report data set to transmission unit 112 (S109). Transmission unit 112 reads out the data packets indicated by the report data set as the lost data packets from the cache, and resends the data packets to receiving side data communication device 12.

The data packet assembling module reports data packet numbers of the lost data packets to the rate determining module (S110).

In parallel with the above explained operations, the probe generating module of receiving side data communication device 12 generates probe data sets that are data sets for measuring RTTs, and hands over the probe data sets to the command communication module (S111). None of the probe data sets contains data indicating actual information.

The command communication module of receiving side data communication device 12 attaches to each of the probe data sets a time stamp indicating a time when the probe data set is transmitted, and transmits the probe data sets with timestamps to transmission side data communication device 11 (S112).

Immediately after the command communication module of transmission side data communication device 11 receives a probe data set from receiving side data communication device 12, the command communication module returns an ACK of the probe data set to receiving side data communication device 12 (S113).

When the command communication module of receiving side data communication device 12 receives an ACK of a probe data set, the command communication module attaches to the probe data set a time stamp indicating a time when the probe data set is received, and hands over the probe data set with the time stamp to the rate determining module (S114).

When the above explained operations are executed, the rate determining module of receiving side data communication device 12 obtains the following data:

(1) data indicating timings of transmissions of data packets from transmission side data communication device 11 to receiving side data communication device 12 and data packet numbers of the transmitted data packets (obtained from the command communication module in S105), (2) data packet numbers of the lost data packets (obtained from the data packet assembling module in S110), and (3) ACKs of probe data sets with timestamps of transmissions and receipts of the probe data sets (obtained from the command communication module in S114).

The rate determining module is a module that determines whether a data transmission rate should be increased or decreased on the basis of the above explained data (1) to (3).

To make the determination, the rate determining module generates the following data in connection with each of plural past certain time periods on the basis of the above explained data (1) to (3):

(a) a data transmission rate calculated on the basis of the above explained data (1), (b) a data loss ratio, namely a ratio of a number of lost data packets to a number of data packets transmitted from transmission side data communication device 11 in a certain time period calculated on the basis of the above explained data (1) and (2), and (c) an RTT calculated on the basis of the above explained data (3).

In the following explanation, it is supposed that, for example, the following data is generated every 5 seconds. Namely, the past certain time periods are time periods obtained by dividing the past period into 5 second blocks.

In the following explanation, for the purpose of simplifying the description, a data transmission rate is referred to as "R," and a data loss ratio is referred to as "L." An RTT is referred to as an "actual measured RTT" for the purpose of distinguishing the RTT from the reference RTT explained in the later part of this specification. Moreover, when each of plural Rs, Ls and actual measured RTTs calculated in connection with plural past certain time periods are required to be distinguished from each other, a number identifying each past certain time period is attached to "R," "L," or "RTT" like "Rn," "Ln," or "RTTn" ("n" is a natural number). A larger value of n indicates that data such as "Rn" is more recent.

FIG. 4 to FIG. 7 show flows of operations executed by the rate determining module for determining whether a data transmission rate should be increased or decreased, on the basis of Rs, Ls and actual measured RTTs obtained, for example, every 5 seconds.

The operations executed by the rate determining module consist of the following four operation modes:

(a) initial mode, (b) reference RTT increase mode, (c) reference RTT decrease mode, and (d) reference RTT increase-decrease quest mode.

FIG. 4 to FIG. 7 correspond to the above-listed mode (a) to mode (d) respectively.

Before bulk data is newly transferred, the rate determining module operates in the initial mode and sets a reference RTT (S201). A reference RTT is an RTT used as a threshold compared with an actual measured RTT.

In a case where transmission side data communication device 11 and receiving side data communication device 12 have executed transfers of bulk data previously, storage unit 121 of receiving side data communication device 12 stores a reference RTT used the previous time together with a data set identifying transmission side data communication device 11 such as an IP address, a host name, and so on. The rate determining module sets the stored reference RTT as an initial reference RTT for the new bulk data transfer in S201.

In a case where transmission side data communication device 11 and receiving side data communication device 12 have not executed any transfer of bulk data before, or in a case where the last used reference RTT corresponding to transmission side data communication device 11 cannot be specified for any reason, such that an IP address or a host name of transmission side data communication device 11 has been changed, and so on, the rate determining module sets a predetermined default reference RTT (for example, 20 ms) as the initial reference RTT in S201.

Then, a transfer of bulk data from transmission side data communication device 11 to receiving side data communication device 12 starts, and R1, L1 and actual measured RTT1 are calculated in connection with the first 5-second time period of the bulk data transfer.

The rate determining module judges whether L1 is equal to or more than a predetermined threshold of data loss ratio (S202). In the example explained below, it is supposed that 0.02, i.e. 2% is used as the threshold of data loss ratio.

When the rate determining module judges that L1 is less than 0.02 in S202 (S202: No), the rate determining module starts to operate in the reference RTT increase mode.

The reference RTT increase mode is a mode executed when it is estimated that there is no serious congestion in the network. In the reference RTT increase mode, the reference RTT, i.e., an acceptable value of an actual measured RTT, is gradually increased. If a comparatively long time is set as the reference RTT, when a data transmission rate is increased and an actual measured RTT is increased as a result of the increase in a data transmission rate, the increased actual measured RTT may be less than the reference RTT and accepted. Accordingly, there is a comparatively high possibility that the rate determining module will instruct to increase a data transmission rate.

In the reference RTT increase mode, the rate determining module increases the reference RTT by, for example, 10% (S203).

Then, the rate determining module compares the last actual measured RTT and the reference RTT, generates a report data set instructing any one of increase, maintenance, or decrease of a data transmission rate following the rules listed below in accordance with a result of the comparison, and hands over the report data set to the command communication module (S204):

(a) in a case where the actual measured RTT is less than the reference RTT, a report data set instructing to increase a data transmission rate is generated, (b) in a case where the actual measured RTT is equal to the reference RTT, a report data set instructing to maintain a data transmission rate is generated, and (c) in a case where the actual RTT is more than the reference RTT, a report data set instructing to decrease a data transmission rate is generated.

The report data set instructing to increase, maintain, or decrease a data transmission rate is transmitted from the command communication module of receiving side data communication device 12 to transmission side data communication device 11. In the following explanation, the above explained series of operations for comparing the last actual measured RTT and the reference RTT, generating a report data set in accordance with a result of the comparison, and transmitting the report data set are referred to as "operations for instructing to change data transmission rate."

Then, the rate determining module calculates transfer score S, that is an index indicating a performance of a data transfer, following a formula shown below using the newest R and L that are periodically updated.

$$S = R \times (1.0 - (L^{0.15}))$$

Figure 8:
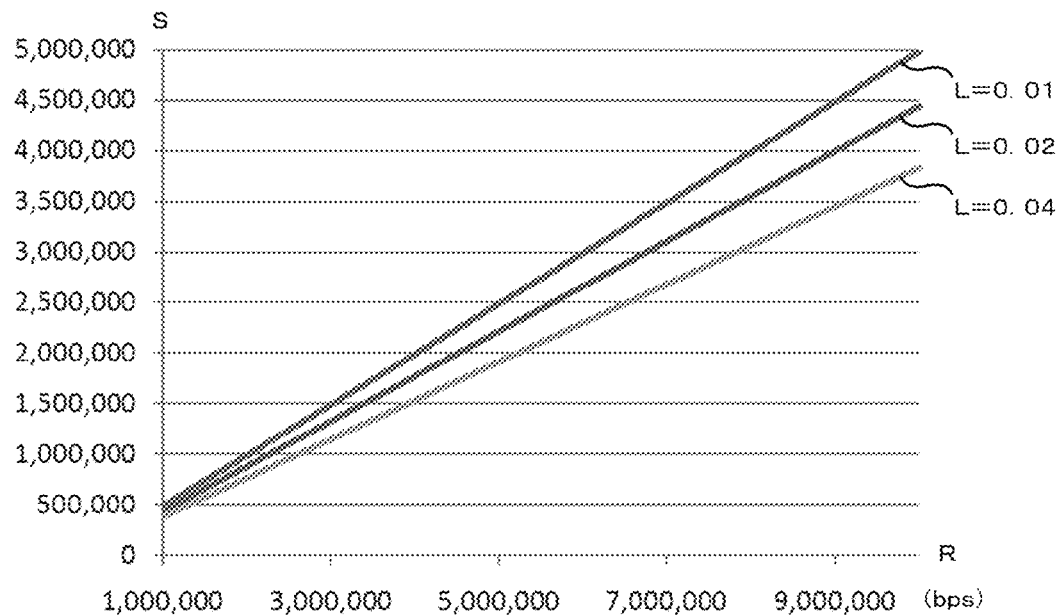
FIG. 8 is a graph showing a characteristic of data transfer score S calculated by the rate determination module according to the exemplary embodiment of the present invention.
Figure 8:
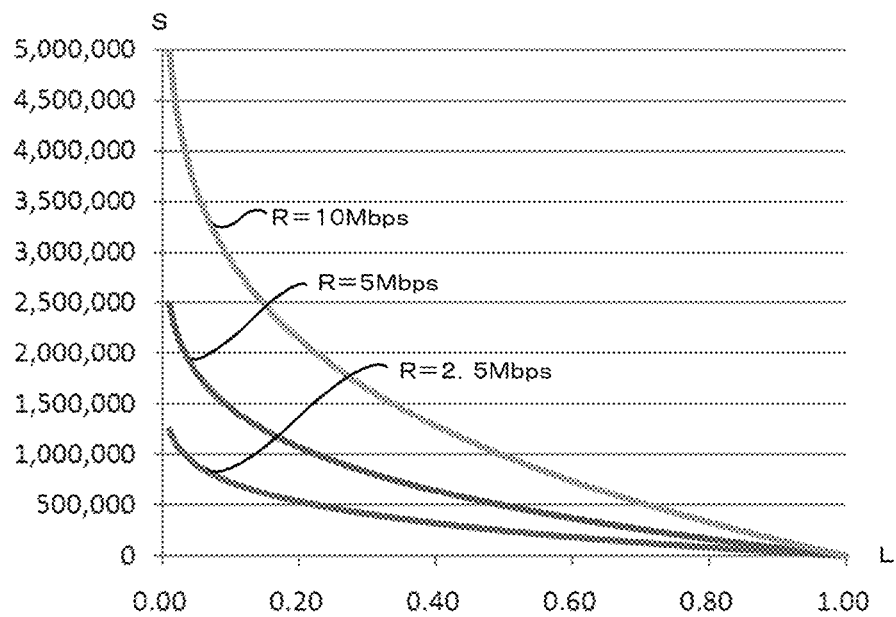

FIG. 8 is a graph showing how data transfer score S changes in accordance with changes of R and L. FIG. 8(*a*) shows a relation between R and S when L is constant, and FIG. 8(*b*) shows a relation between L and S when R is constant. As shown in FIG. 8(*a*), when L is constant, S monotonically increases in accordance with an increase in R. In other words, when L is constant, as R becomes larger, S becomes higher.

As shown in FIG. 8(*b*), when R is constant, S monotonically increases in accordance with an increase in L. In other words, when R is constant, as L becomes larger, S becomes lower.

Further as shown in FIG. 8(*b*), a partial derivative with respect to L, i.e. a first derivation of L with constant R, monotonically increases in accordance with an increase in L. In other words, as L becomes smaller, an absolute value of change rate of S becomes larger. Accordingly, the smaller L is, the more sensitively S changes in accordance with a change in L.

A transfer score S that has the above explained characteristics is more influenced by a change in L than by a change in R when a data transfer is executed between transmission side data communication device 11 and receiving side data communication device 12 that are comparatively close to each other in the network, and when a data loss ratio is comparatively low. In a data transfer between two devices that are comparatively close to each other, data loss is likely to be caused by network congestion in general. Accordingly, S that has a characteristic to change sensitively in accordance with change of data loss ratio when L is comparatively low is a feasible index indicating a degree of possible network congestion.

On the other hand, when a data transfer is executed between transmission side data communication device 11 and receiving side data communication device 12 that are comparatively far away from each other in the network or the data transfer is executed via a wireless network, and when a data loss ratio is comparatively high, a transfer score S is less influenced by a change in L than by a change in R. In a data transfer between two devices that are comparatively far away from each other or in a data transfer executed via a wireless network, data loss may be caused by various factors not limited to network congestion. Accordingly, S that has a characteristic not to change sensitively in accordance with a change in data loss ratio when L is comparatively high is a feasible index indicating a degree of possible network congestion.

Figure 4:
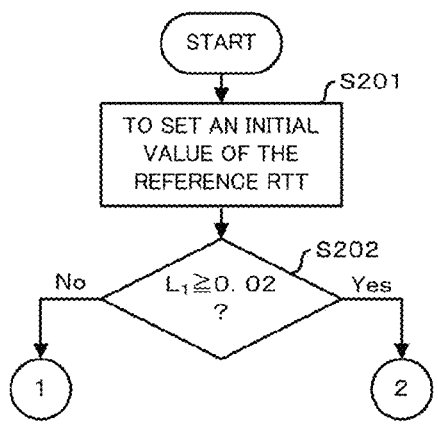
FIG. 4 shows a flow of operations executed by a rate determination module according to the exemplary embodiment of the present invention for judging whether a data transmission rate should be increased or decreased in an initial mode.
Figure 5:
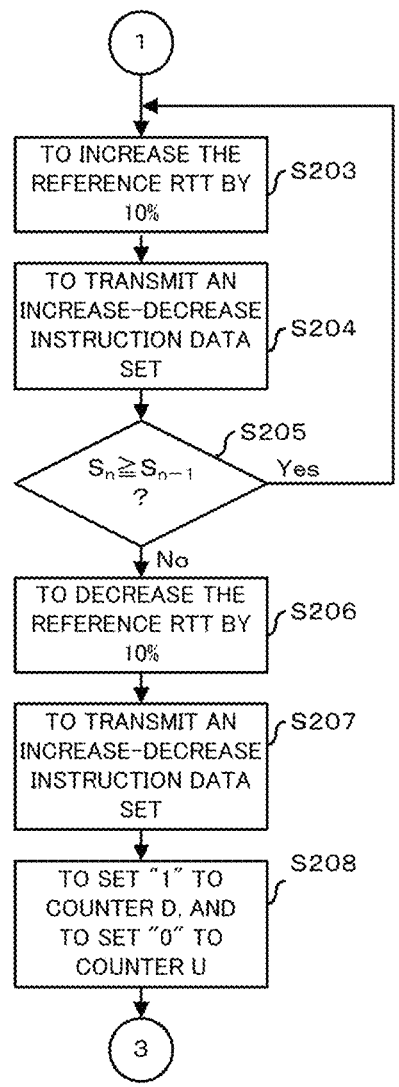
FIG. 5 shows a flow of operations executed by the rate determination module according to the exemplary embodiment of the present invention for judging whether a data transmission rate should be increased or decreased in a reference RTT increase mode.
Figure 6:
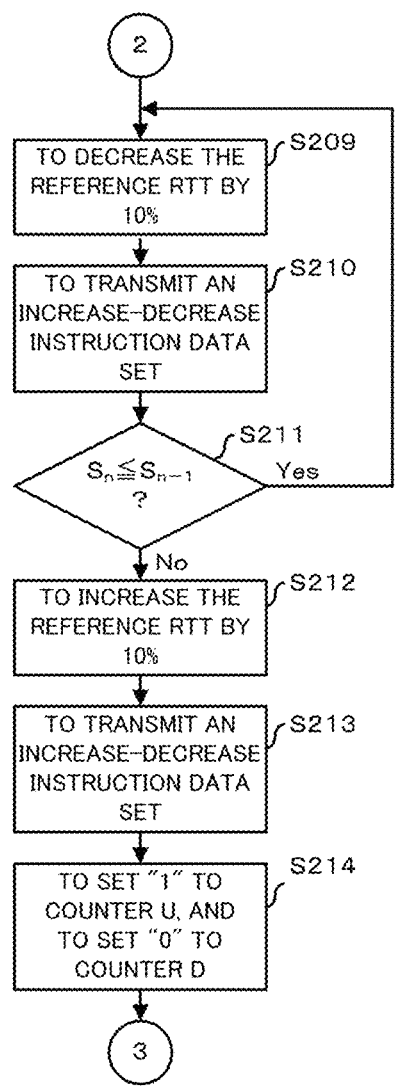
FIG. 6 shows a flow of operations executed by the rate determination module according to the exemplary embodiment of the present invention for judging whether a data transmission rate should be increased or decreased in a reference RTT decrease mode.
Figure 7:
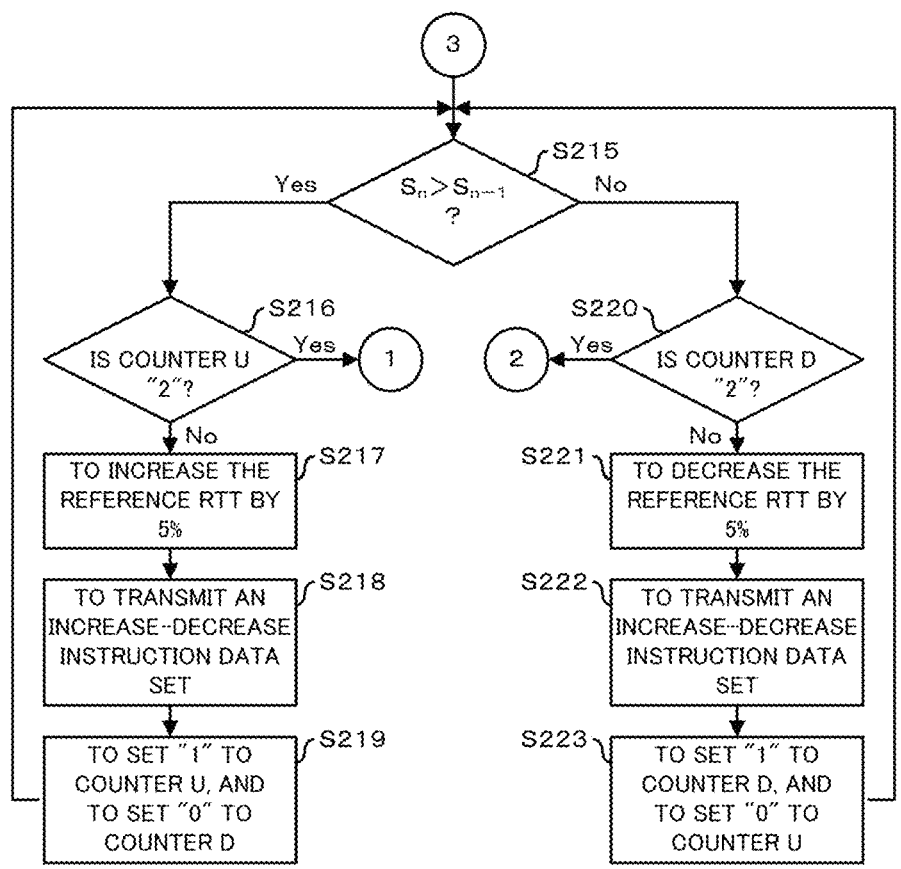
FIG. 7 shows a flow of operations executed by the rate determination module according to the exemplary embodiment of the present invention for judging whether a data transmission rate should be increased or decreased in a reference RTT increase-decrease quest mode.

Now the explanation of characteristics of transfer score S is finished, and the flow of operations of the rate determining module will be continued with reference to FIG. 4.

The rate determining module calculates Sn and Sn−1 by use of Rn and Ln in connection with the last 5-second time period, and Rn−1 and Ln−1 in connection with the second last 5-second time period, and judges whether Sn is equal to or more than Sn−1; in other words, whether S is maintained or improved (S205).

When the rate determining module judges that Sn is equal to or more than Sn−1 (S205: Yes), the rate determining module returns its operation to S203 and repeats the above explained operations in the reference RTT increase mode (S203~S205).

On the other hand, when the rate determining module judges that Sn is less than Sn−1 (S205: No), the rate determining module decreases the reference RTT that was increased in the last S203 by 10% so that the reference RTT is changed back to almost the same value before the last S203 (S206), and executes operations for instructing to change data transmission rate (S207).

Then, the rate determining module sets "1" to counter D that is a counter for counting a number of times of decreases of the reference RTT in succession, and sets "0" to counter U that is a counter for counting a number of times of increases of the reference RTT in succession (S208). Then the rate determining module starts to operate in the reference RTT increase-decrease quest mode.

Now the explanation of flow of operations executed by the rate determining module in the reference RTT increase mode is finished. A flow of operations executed by the rate determining module in the reference RTT increase-decrease quest mode will be explained after the following explanation of flow of operations executed by the rate determining module in the reference RTT decrease mode.

In S202, when the rate determining module judges that L1 is equal to or more than 0.02 (S202: Yes), the rate determining module starts to operate in the reference RTT decrease mode.

The reference RTT decrease mode is a mode executed when it is estimated that there is considerable congestion in the network. In the reference RTT decrease mode, the reference RTT, i.e. an acceptable value of an actual measured RTT, is gradually decreased. If a comparatively short time is set as the reference RTT, an actual measured RTT may easily exceed the acceptable value defined by the reference RTT unless a data transmission rate is decreased. Accordingly, there is a comparatively high possibility that the rate determining module may instruct to decrease a data transmission rate.

In the reference RTT decrease mode, the rate determining module decreases the reference RTT by, for example, 10% (S209).

Then, the rate determining module executes operations for instructing to change data transmission rate (S210).

Then, the rate determining module calculates Sn and Sn−1, and judges whether Sn is equal to or less than Sn−1; in other words, whether S is maintained or degraded (S211).

When the rate determining module judges that Sn is equal to or less than Sn−1 (S211: Yes), the rate determining module returns its operation to S209 and repeats the above explained operations in the reference RTT decrease mode (S209~S211).

On the other hand, when the rate determining module judges that Sn is more than Sn−1 (S211: No), the rate determining module increases the reference RTT that was decreased in the last S209 by 10% so that the reference RTT is changed back to almost the same value as that prior to the last S209 (S212), and executes operations for instructing to change data transmission rate (S213).

Then, the rate determining module sets "1" to counter U and sets "0" to counter D (S214), and starts to operate in the reference RTT increase-decrease quest mode.

Now the explanation of flow of operations executed by the rate determining module in the reference RTT decrease mode is finished, and a flow of operations executed by the rate determining module in the reference RTT increase-decrease quest mode will be explained below.

In the reference RTT increase-decrease quest mode, the rate determining module judges whether Sn is more than Sn−1; in other words, whether S is improved (S215).

In S215, when the rate determining module judges that Sn is more than Sn−1 (S215: Yes), the rate determining module judges whether a value of counter U is "2" (S216). This judgment is aimed to check whether the improvement of S is achieved after the reference RTT was increased twice in succession.

In S216, when the rate determining module judges that a value of counter U is not "2" (S216: No); namely, when the reference RTT was not increased twice in succession, the rate determining module increases the reference RTT by, for example, 5% (S217), and executes operations for instructing to change data transmission rate (S218).

It should be noted that a change rate of reference RTT in the reference increase-decrease quest mode is smaller than that in the reference RTT increase mode or in the reference RTT decrease mode, since a possibility that considerable congestion is occurring in the network and a possibility that little congestion is occurring in the network are basically at the same level. As a result, a bumpy change of reference RTT is avoided.

After S218, the rate determining module increase a value of counter U by "1" and sets "0" to counter D. Then, the rate determining module returns its operation to S215 and continues to operate in the reference RTT increase-decrease mode.

On the other hand, when the rate determining module judges that a value of counter U is "2" in S216 (S216: Yes), namely when S is improved after the reference RTT was increased twice in succession, the rate determining module starts to operate in the reference RTT increase mode, since it is estimated that little congestion is occurring in the network.

As shown at the beginning of FIG. 4(d), when the rate determining module judges that Sn is equal to or less than Sn−1 in S215 (S215: No), the rate determining module judges whether a value of counter D is "2" (S220). This judgment is aimed to check whether the improvement of S is not achieved even after the reference RTT was increased twice in succession.

In S220, when the rate determining module judges that a value of counter D is not "2" (S220: No), namely when the reference RTT was not decreased twice in succession, the rate determining module decreases the reference RTT by, for example, 5% (S221), and executes operations for instructing to change data transmission rate (S222).

As previously stated, it should be noted that a change rate of reference RTT in S222 is smaller than that in the reference RTT decrease mode.

After S222, the rate determining module increases a value of counter D by "1" and sets "0" to counter U (S223). Then, the rate determining module returns its operation to S215 and continues to operate in the reference RTT increase-decrease mode.

On the other hand, when the rate determining module judges that a value of counter D is "2" in S220 (S220: Yes); namely, when S is not improved even after the reference RTT was decreased twice in succession, the rate determining module starts to operate in the reference RTT decrease mode, since it is estimated that considerable congestion is occurring in the network.

Now the explanation of operations of the rate determining module for determining whether a data transmission rate should be increased, maintained or decreased is finished.

As previously stated, a report data set instructing to change a data transmission rate is generated in accordance with a result of judgment executed by the rate determining module, and transmitted from receiving side data communication device 12 to transmission side data communication device 11.

When transmission side data communication device 11 receives a report data set, transmission side data communication device 11 changes a data transmission rate at a change rate determined by a predetermined rule, such as 10% of a current data transmission rate, following an instruction indicated by the report data set. As a result, a bandwidth used for data transfer is controlled so that, when it is estimated that considerable congestion is occurring in the network, there is a high possibility that data transmission rate is decreased; and when it is estimated that little congestion is occurring in the network, there is a high possibility that data transmission rate is increased.

As explained above, according to data transfer system 1, when a data transfer is executed between two nodes in a network, a bandwidth used for the data transfer is not sensitively changed in response to a change in data loss ratio that is not caused by network congestion, such as a long distance between the nodes and an existence of wireless network on the data communication route between the nodes, and the bandwidth is sensitively changed in response to a change in data loss ratio that is caused by network congestion.

Moreover, according to data transfer system 1, even when a data loss ratio is increased to a certain extent, a data transmission rate may be increased under a condition where increase of data transmission rate may cause a better performance of data transfer since a current data transmission rate also influences the bandwidth control. As a result, data transfer system 1 can achieve a higher performance of data transfer than a system that controls a bandwidth for data transfer only in accordance with data loss ratio.

Moreover, according to data transfer system 1, a data loss ratio and a data transmission rate themselves are not used as criteria for the bandwidth control; namely, a bandwidth is controlled via a change in a reference RTT. As a result, a data transmission rate is changed not deterministically but probabilistically in response to a change in actual measured RTT that tends to follow a status of congestion in a network. Accordingly, the bandwidth control of data transfer system 1 has a low risk of causing a mismatch between a bandwidth used for a data transfer and an actual condition of the network.

Moreover, according to data transfer system 1, the reference RTT increase mode and the reference RTT decreased mode are switched with each other via the reference RTT increase-decrease quest mode. A change rate in reference RTT in the reference RTT increase-decrease quest mode is smaller than that in the reference RTT increase mode or in the reference RTT decrease mode, and the reference RTT increase-decrease quest mode functions as a buffer mode for avoiding a bumpy change of data transmission rate that may be caused if the reference RTT increase mode and the reference RTT decrease mode are directly switched with each other.

MODIFICATIONS

The above explained embodiment may be modified in several ways within the scope of the technical idea of the present invention. Some examples of such modifications are provided below.

According to data transfer system 1 explained above, receiving side data communication device 12 changes reference RTT in accordance with data loss ratio L and data transmission rate R, and judges whether a data transmission rate should be increased, maintained, or decreased on the basis of comparison of a reference RTT and an actual measured RTT. In a modification of data transfer system 1, at least some of the operations executed by receiving side data communication device 12 in the above-explained data transfer system 1 may be executed by transmission side data communication device 11 instead of receiving side data communication device 12.

In this modification, transmission side data communication device 11 may be configured to transmit a probe data set to receiving side data communication device 12 and to receive an ACK in response to the probe data set from receiving side data communication device 12, so that transmission side data communication device 11 can measure an actual measured RTT. A data transmission rate R is a rate at which transmission side data communication device 11 transmits data, and it is known by transmission side data communication device 11. Further, in this modification, receiving side data communication device 12 may be configured to transmit a data set indicating data loss rate L calculated by receiving side data communication device 12 to transmission side data communication device 11 so that transmission side data communication device 11 can obtain data loss rate L. Further, in this modification, transmission side data communication device 11 may be configured to have a rate determining module having the same function as the rate determining module of receiving side data communication device 12 in the above explained data transfer system 1. In this modification, transmission side data communication device 11 judges whether a data transmission rate should be increased, maintained or decreased, and changes a data transmission rate in accordance with a result of the judgment made by transmission side data communication device 11.

In another modification of data transfer system 1, receiving side data communication device 12 may be configured to determine a reference RTT in the same way as in data transfer system 1 explained above, and to transmit the determined reference RTT to transmission side data communication device 11. In this modification, transmission side data communication device 11 may be configured to transmit a probe data set to receiving side data communication device 12 and receive an ACK in response to the probe data set from receiving side data communication device 12 to measure an actual measured RTT. In this modification, transmission side data communication device 11 may be configured to compare an actual measured RTT and a reference RTT, and judge whether a data transmission rate should be increased, maintained, or decreased, based on a result of the comparison. In this modification, transmission side data communication device 11 can change a data transmission rate in accordance with a result of the judgment made by transmission side data communication device 11.

In another modification of data transfer system 1, transmission side data communication device 11 may be configured to store a reference RTT that was used in a previous data transfer together with a data set identifying receiving side data communication device 12 with which the previous data transfer was executed instead of receiving side data communication device 12 storing a reference RTT that was used in a previous data transfer together with a data set identifying transmission side data communication device 11 by which the previous data transfer was executed. In a case where a reference RTT is changed by receiving side data communication device 12, receiving side data communication device 12 may be configured to receive a reference RTT that was used in a previous data transfer from transmission side data communication device 11 for the change of reference RTT.

In data transfer system 1 explained above, an RTT that is defined as a time required for data to travel a round trip between transmission side data communication device 11 and receiving side data communication device 12 is used as a data set indicating a time period required for data transfer between the devices. Instead of an RTT, a One Way Delay (OWD) that is defined as a time required for data to travel a one way trip from transmission side data communication device 11 to receiving side data communication device 12 or from receiving side data communication device 12 to transmission side data communication device 11 may be used. In this modification, a mechanism for synchronizing a time measured by a timer of transmission side data communication device 11 and a time measured by a timer of receiving side data communication device 12 is required, and any known mechanism for synchronizing times measured by two different devices may be adopted in this modification.

Details of data transfer system 1 explained above, such as the numerical values, flows of operations, and so on, are mere examples for explaining the present invention that are not aimed to limit the scope of the present invention. For example, the numerical values used in the formula for calculating transfer score S and the structure of the formula may be changed in various ways. Change rates in reference RTT and data transmission rate are also parameters that may be configured when the invention is implemented.

In data transfer system 1 explained above, it is supposed that bulk data is to be transferred between data communication devices. Types of data transferred in a system of the present invention should not be limited to bulk data, and any data with any format, size, and so on may be transferred in the system. For example, data of a comparatively small size may be transferred between two nodes following a method of the present invention, and streaming data may also be transferred between two nodes following a method of the present invention.

A data transfer system and a data transfer method according to the present invention are variously applicable in a service industry for providing data transfer services, and so on.

What is claimed is:

1. A data transfer method performed by a data transfer system for transferring data from a transmission side data communication device to a receiving side data communication device comprising:

when
a data transmission rate is defined as a data amount transmitted in a unit time from the transmission side data communication device to the receiving side data communication device, a data loss ratio is defined as a ratio of an amount of data not received by the receiving side data communication device to an amount of data transmitted from the transmission side data communication device to the receiving side data communication device, and a data transmission required time is defined as a one way or a round trip time required for data to travel between the transmission side data communication device and the receiving side data communication device, obtaining, by the receiving side data communication device, a data transmission rate, a data loss ratio, and a data transmission required time, in relation to a past certain time period;

calculating, by the receiving side data communication device, an index indicating a performance of data transmission following a predetermined formula based on the obtained data transmission rate and the obtained data loss ratio in relation to a past certain time period, increasing, by the receiving side data communication device, a threshold of data transmission required time following a predetermined rule when one or more obtained data transmission rates and one or more obtained data loss ratios in relation to one or more past certain time periods meet a first predetermined condition; and decreasing the threshold of data transmission required time following a predetermined rule when the one or more obtained data transmission rates and the one or more obtained data loss ratios in relation to the one or more past certain time periods meet a second predetermined condition;

transmitting, by the receiving side data communication device, an instruction data set instructing to increase a data transmission rate when an obtained data transmission required time in relation to a past certain time period is shorter than the threshold of data transmission required time; and transmitting an instruction data set instructing to decrease a data transmission rate when the obtained data transmission required time in relation to the past certain time period is longer than the threshold of data transmission required time; and changing, by the transmission side data communication device, a data transmission rate at which data is transmitted to the receiving side data communication device following an instruction indicated by an instruction data set transmitted from the receiving side data communication device;

wherein:
when
a first direction is defined as a calculated direction of change from an index calculated in relation to a first past certain time period to an index calculated in relation to a second past certain time period later than the first past certain time period, and a second direction is defined as a calculated direction of change from the index calculated in relation to the second past certain time period to an index calculated in relation to a third past certain time period later than the second past certain time period, the first predetermined condition is met when the second direction is a predetermined direction, and the second predetermined condition is met when the second direction is opposite to the predetermined direction;

the predetermined rule for increasing the threshold of data transmission required time is a rule by which the threshold of data transmission required time is increased at a smaller rate of increase in a case where the first direction and the second direction are opposite than in a case where the first direction and the second direction are the same; and the predetermined rule for decreasing the threshold of data transmission required time is a rule by which the threshold of data transmission required time is decreased at a smaller rate of decrease in a case where the first direction and the second direction are opposite than in a case where the first direction and the second direction are the same.

2. The data transfer method according to claim 1 wherein:
a value of function of data transmission rate and data loss ratio is calculated as the index in the calculating step, the function being a monotonically increasing function of data transmission rate and being a monotonically decreasing function of data loss ratio, and a partial derivative of the function with respect to data loss ratio being a monotonically increasing function of data loss ratio.

3. The data transfer method according to claim 1 comprising:
storing, by the receiving side data communication device, a data set indicating the threshold of data transmission required time used for past data transmission in association with a data set identifying the transmission side data communication device, or storing, by the transmission side data communication device, a data set indicating the threshold of data transmission required time used for past data transmission in association with a data set identifying the receiving side data communication device.

4. A data transfer method performed by a data transfer system for transferring data from a transmission side data communication device to a receiving side data communication device comprising:
when
a data transmission rate is defined as a data amount transmitted in a unit time from the transmission side data communication device to the receiving side data communication device,
a data loss ratio is defined as a ratio of an amount of data not received by the receiving side data communication device to an amount of data transmitted from the transmission side data communication device to the receiving side data communication device, and
a data transmission required time is defined as a one way or a round trip time required for data to travel between the transmission side data communication device and the receiving side data communication device,
obtaining, by the receiving side data communication device, a data transmission rate and a data loss ratio in relation to a past certain time period;
obtaining, by the transmission side data communication device, a data transmission required time in relation to a past certain time period;
calculating, by the receiving side data communication device, an index indicating a performance of data transmission following a predetermined formula based on the obtained data transmission rate and the obtained data loss ratio in relation to a past certain time period,
increasing, by the receiving side data communication device, a threshold of data transmission required time following a predetermined rule when one or more obtained data transmission rates and one or more obtained data loss ratios in relation to one or more past certain time periods meet a first predetermined condition; and decreasing the threshold of data transmission required time following a predetermined rule when the one or more obtained data transmission rates and the one or more obtained data loss ratios in relation to the one or more past certain time periods meet a second predetermined condition;
transmitting, by the receiving side data communication device, the threshold of data transmission required time to the transmission side data communication device; and increasing, by the transmission side data communication device, a data transmission rate at which data is transmitted to the receiving side data communication device when an obtained data transmission required time in relation to a past certain time period is shorter than the threshold of data transmission required time; and decreasing a data transmission rate at which data is transmitted to the receiving side data communication device when the obtained data transmission required time in relation to the past certain time period is longer than the threshold of data transmission required time;
wherein:
when
a first direction is defined as a calculated direction of change from an index calculated in relation to a first past certain time period to an index calculated in relation to a second past certain time period later than the first past certain time period, and
a second direction is defined as a calculated direction of change from the index calculated in relation to the second past certain time period to an index calculated in relation to a third past certain time period later than the second past certain time period,
the first predetermined condition is met when the second direction is a predetermined direction, and the second predetermined condition is met when the second direction is opposite to the predetermined direction;
the predetermined rule for increasing the threshold of data transmission required time is a rule by which the threshold of data transmission required time is increased at a smaller rate of increase in a case where the first direction and the second direction are opposite than in a case where the first direction and the second direction are the same; and
the predetermined rule for decreasing the threshold of data transmission required time is a rule by which the threshold of data transmission required time is decreased at a smaller rate of decrease in a case where the first direction and the second direction are opposite than in a case where the first direction and the second direction are the same.

5. The data transfer method according to claim 4 wherein:
a value of function of data transmission rate and data loss ratio is calculated as the index in the calculating step, the function being a monotonically increasing function of data transmission rate and being a monotonically decreasing function of data loss ratio, and a partial derivative of the function with respect to data loss ratio being a monotonically increasing function of data loss ratio.

6. The data transfer method according to claim 4 comprising:
storing, by the receiving side data communication device, a data set indicating the threshold of data transmission required time used for past data transmission in association with a data set identifying the transmission side data communication device, or storing, by the transmission side data communication device, a data set indicating the threshold of data transmission required time used for past data transmission in association with a data set identifying the receiving side data communication device.

7. A data transfer method performed by a data transfer system for transferring data from a transmission side data communication device to a receiving side data communication device comprising:
when a data transmission rate is defined as a data amount transmitted in a unit time from the transmission side data communication device to the receiving side data communication device, a data loss ratio is defined as a ratio of an amount of data not received by the receiving side data communication device to an amount of data transmitted from the transmission side data communication device to the receiving side data communication device, and a data transmission required time is defined as a one way or a round trip time required for data to travel between the transmission side data communication device and the receiving side data communication device, obtaining, by the transmission side data communication device, a data transmission rate, a data loss ratio, and a data transmission required time, in relation to a past certain time period;

calculating, by the transmission side data communication device, an index indicating a performance of data transmission following a predetermined formula based on the obtained data transmission rate and the obtained data loss ratio in relation to a past certain time period, increasing, by the transmission side data communication device, a threshold of data transmission required time following a predetermined rule when one or more obtained data transmission rates and one or more obtained data loss ratios in relation to one or more past certain time periods meet a first predetermined condition; and decreasing the threshold of data transmission required time following a predetermined rule when the one or more obtained data transmission rates and the one or more obtained data loss ratios in relation to the one or more past certain time periods meet a second predetermined condition; and increasing, by the transmission side data communication device, a data transmission rate at which data is transmitted to the receiving side data communication device when an obtained data transmission required time in relation to a past certain time period is shorter than the threshold of data transmission required time; and decreasing a data transmission rate at which data is transmitted to the receiving side data communication device when the obtained data transmission required time in relation to the past certain time period is longer than the threshold of data transmission required time;

wherein:
when
a first direction is defined as a calculated direction of change from an index calculated in relation to a first past certain time period to an index calculated in relation to a second past certain time period later than the first past certain time period, and a second direction is defined as a calculated direction of change from the index calculated in relation to the second past certain time period to an index calculated in relation to a third past certain time period later than the second past certain time period, the first predetermined condition is met when the second direction is a predetermined direction, and the second predetermined condition is met when the second direction is opposite to the predetermined direction;

the predetermined rule for increasing the threshold of data transmission required time is a rule by which the threshold of data transmission required time is increased at a smaller rate of increase in a case where the first direction and the second direction are opposite than in a case where the first direction and the second direction are the same; and the predetermined rule for decreasing the threshold of data transmission required time is a rule by which the threshold of data transmission required time is decreased at a smaller rate of decrease in a case where the first direction and the second direction are opposite than in a case where the first direction and the second direction are the same.

8. The data transfer method according to claim 7 wherein:

a value of function of data transmission rate and data loss ratio is calculated as the index in the calculating step, the function being a monotonically increasing function of data transmission rate and being a monotonically decreasing function of data loss ratio, and a partial derivative of the function with respect to data loss ratio being a monotonically increasing function of data loss ratio.

9. The data transfer method according to claim 7 comprising:

storing, by the receiving side data communication device, a data set indicating the threshold of data transmission required time used for past data transmission in association with a data set identifying the transmission side data communication device, or storing, by the transmission side data communication device, a data set indicating the threshold of data transmission required time used for past data transmission in association with a data set identifying the receiving side data communication device.

* * * * *